(No Model.) 4 Sheets—Sheet 1.

T. THATCHER.
DIVIDED CYLINDER STEAM ENGINE.

No. 477,027. Patented June 14, 1892.

Witnesses
W. A. Courtland
Nellie L. Pope.

Inventor
THOMAS THATCHER
BY HIS ATTORNEY
Edward P. Thompson (No Model.) 4 Sheets—Sheet 2.
T. THATCHER.
DIVIDED CYLINDER STEAM ENGINE.
No. 477,027. Patented June 14, 1892.
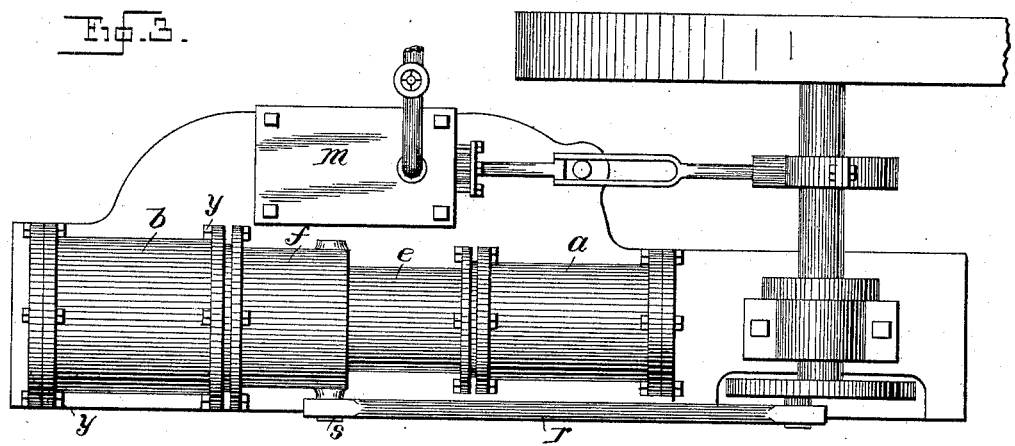
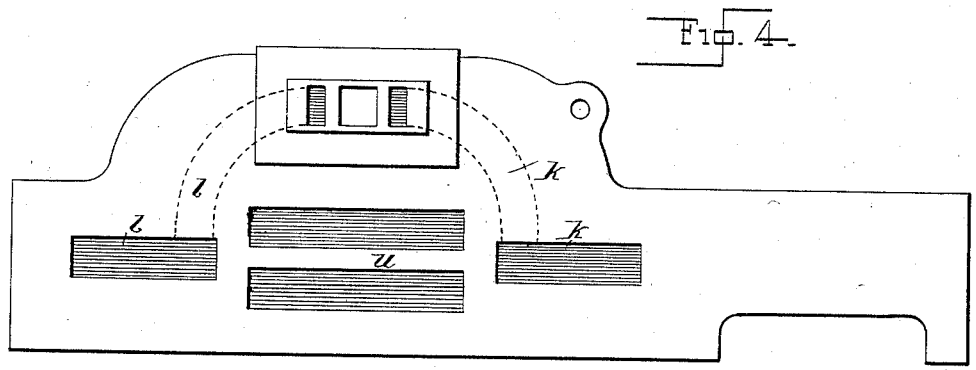
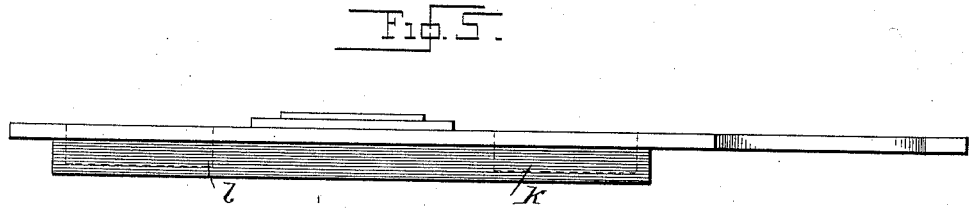
Witnesses
W. H. Courtland
Nellie L. Pope
Inventor
THOMAS THATCHER
BY HIS ATTORNEY
Edward P. Thompson
THE NORRIS PETERS CO., PHOTO-LITHO., WASHINGTON, D. C.

(No Model.) 4 Sheets—Sheet 3.

T. THATCHER.
DIVIDED CYLINDER STEAM ENGINE.

No. 477,027. Patented June 14, 1892.

Witnesses
W. H. Courtland
Nellie L. Pope

Inventor
THOMAS THATCHER
BY HIS ATTORNEY
Edward P. Thompson (No Model.)  4 Sheets—Sheet 4.
T. THATCHER.
DIVIDED CYLINDER STEAM ENGINE.
No. 477,027. Patented June 14, 1892.
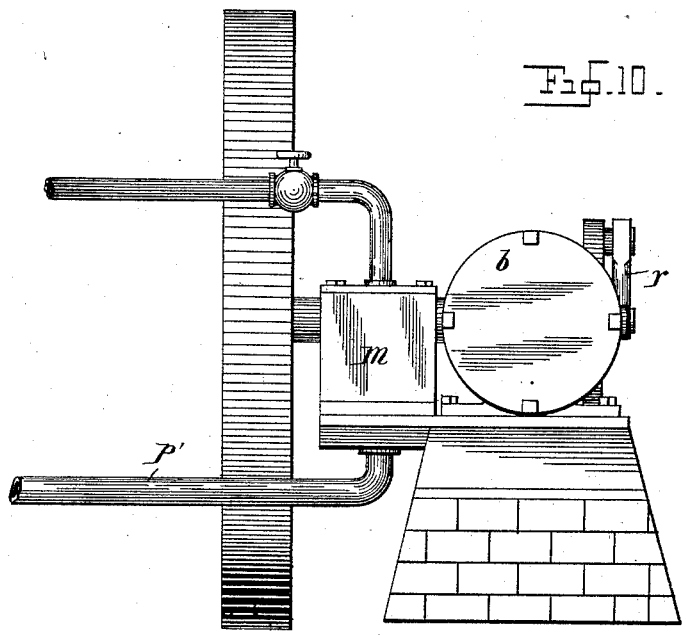
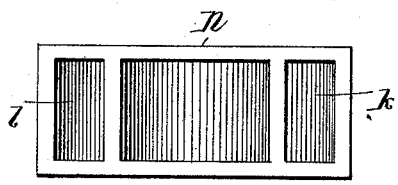
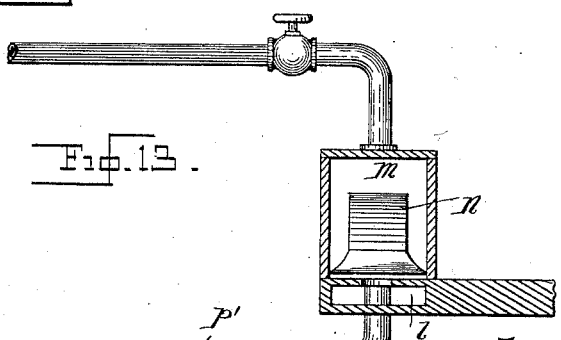
Witnesses
W. H. Courtland
Nellie L. Pope
Inventor
THOMAS THATCHER
BY HIS ATTORNEY
Edward F. Thompson

UNITED STATES PATENT OFFICE.

THOMAS THATCHER, OF ELIZABETHPORT, NEW JERSEY.

DIVIDED-CYLINDER STEAM-ENGINE.

SPECIFICATION forming part of Letters Patent No. 477,027, dated June 14, 1892.

Application filed February 6, 1892. Serial No. 420,561. (No model.)

*To all whom it may concern:*

Be it known that I, THOMAS THATCHER, a citizen of the United States, and a resident of Elizabethport, in the county of Union and State of New Jersey, have invented certain new and useful Improvements in Divided-Cylinder Steam-Engines, of which the following is a specification.

My invention relates to that class of steam-engines in which exhaust-steam from the cylinder is conducted to a second cylinder for the purpose of increasing the efficiency of steam-power.

The exact nature of the invention is best set forth by reference to the accompanying drawings.

Figure 1:
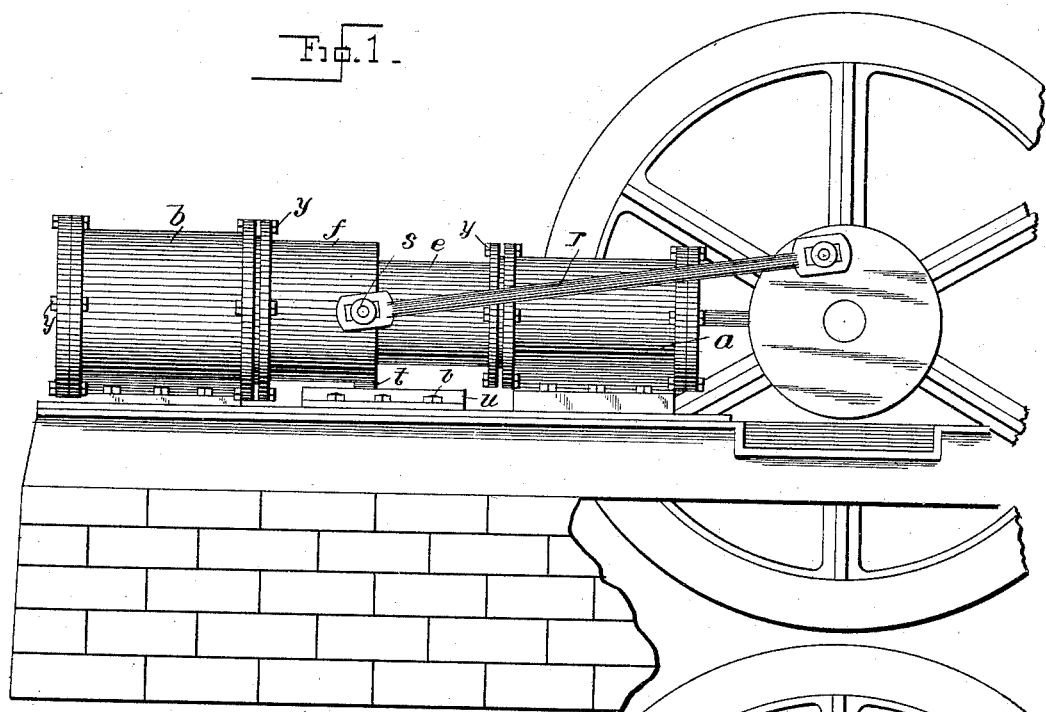
Figure 2:
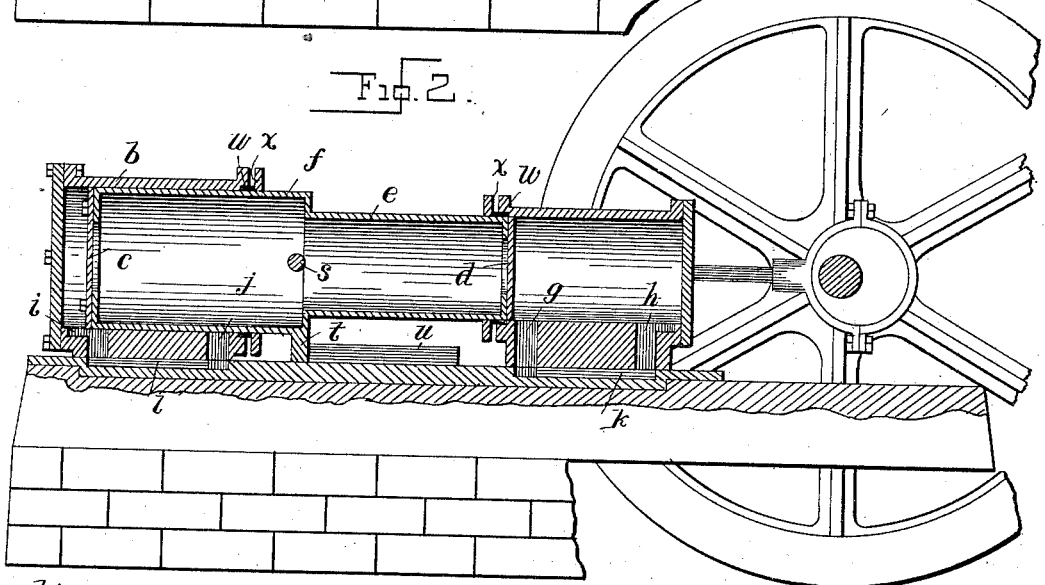
Figure 6:
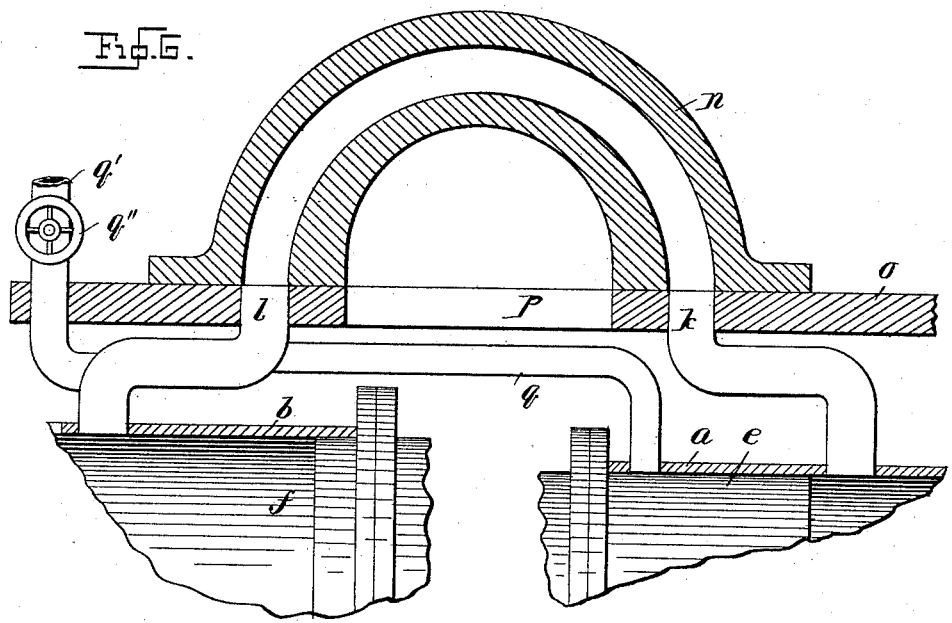
Figure 7:
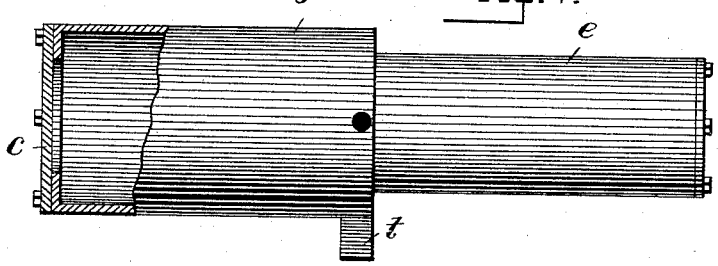
Figure 8:
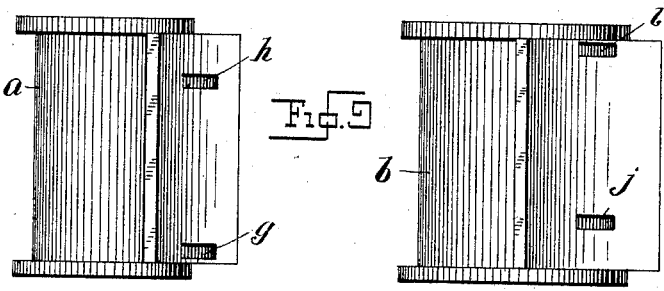
Figure 9:
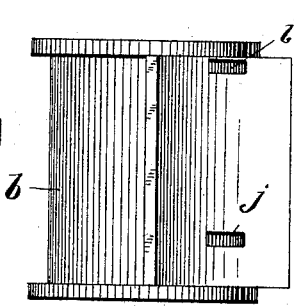

Figure 1 is a view of the engine in elevation with a portion of the foundation. A part of the non-essential elements of the invention—such as the fly-wheel—is broken away in order to bring the engine on a large scale within the limits of the sheet of drawings. Fig. 2 is a view of the same engine in vertical elevation, some of the parts, as before, being omitted. The section is taken through the centers of the steam-cylinders. This figure brings into view the ports of the cylinders and bed-plate, as well as other important features. Fig. 3 is a plan of that shown in Fig. 1. It is an exterior of the complete engine. Fig. 4 is a plan of the bed-plate, showing the ports therein, as well as the bed-plate of the valve and steam-chest. Fig. 5 is a side view of that which is seen in Fig. 4. Fig. 6 is a view to illustrate the valve movement. It is in section. It is more a diagram than an accurate section. Fig. 7 is an elevation of the double plunger or piston. A part is shown in section, thereby identifying it with the view in Fig. 2. Figs. 8 and 9 are both corresponding views of the two cylinders, the same being so located that their bases are visible, together with their ports. Fig. 10 is an end view of the engine in elevation. Figs. 11 and 12 are respectively end and inverted plan of the slide-valve. Fig. 13 is a cross-section of that part of the engine relating particularly to the steam-chest and is intended particularly to show the exhaust-valve.

$a$ is the cylinder, which takes the live steam, and $b$ that which takes the exhaust. If they were of equal size they would interfere with the operation of the engine. The cross-sectional area of the inner portion of the exhaust-steam cylinder is twice that of the live-steam cylinder $a$. Their central longitudinal axes coincide and they are at a suitable distance from each other. A plunger or piston is provided for each and are in rigid connection with each other. The said plungers may be termed a "double" or "compound" plunger. They are cast hollow, the ends being closed by plates $c$ $d$, bolted to the ends. The smaller plunger—that is, the one for the cylinder $a$—is lettered $e$, and the larger $f$. The appearance of the plungers is that of two cylinders of different diameters joined end to end. The lengths of the two cylinders $a$ and $b$ are equal.

At opposite ends of the cylinder $a$ are ports $g$ and $h$, and at opposite ends of the cylinder $b$ are ports $i$ $j^2$. These ports lead from the respective cylinders to the steam-chest. The two ports $g$ $h$ lead into the common port $k$, and the ports $i$ $j$ lead into the common port $l$. The said ports $k$ and $l$ may be seen to best advantage in Fig. 4. They are the channels connecting the ports $g$ $h$ and $i$ $j$, respectively, to the steam-chest $m$.

In order to be able to follow the path of the steam during operation, the slide-valve and its adjuncts are shown in Fig. 6. The valve is shown in approximately its central position. It is lettered $n$. The bed-plate of the steam-chest is $o$. It has the ports $k$ $l$, already alluded to, and the exhaust-port $p$, with which connects the exhaust-steam pipe $p'$. There is a pipe $q$, which connects the left-hand end of cylinder $a$ with the left-hand end of cylinder $b$. There is another supplementary pipe $q'$, which connects the left-hand end of cylinder $b$ with the steam-chest, it being understood that in Fig. 6 all the space above the valve $n$ and plate $o$ may be considered as the steam-space. The steam enters the port $k$, when the valve is at the extreme left, and drives the plungers, and especially plunger $e$, to the left end of the cylinder $a$, and at the same time the eccentric is properly active in moving the valve to its proper place, so that as soon as the plunger $f$ has arrived at the left end of the cylinder $b$ the exhaust-steam passes in the path shown in Fig. 6 from the cylinder *a* to the cylinder *b*. The pressure of the exhaust-steam from the cylinder *a* is exerted upon the plunger *f* (being twice the area of that of the plunger *e*) and causes the compound plunger to be driven back to the starting position. In a manner similar to that of other engines the valve so moves next as to allow the steam from the cylinder *b* to exit into the pipe *p'*, and thence into the atmosphere or into a condenser, as the case may be. This operation is repeated continually, whereby power is obtained for useful work. It should be noted that the function of the pipe *q* is important. When the plunger *e* has arrived at the left end of the cylinder *a*, the exhaust-steam should be allowed at the very first to escape with great freedom, and therefore, in view of the location of the said pipe, it can pass for an instant from the said cylinder *a* to the cylinder *b* through the pipe *q*, which is then closed by the plunger *e*. Subsequently, during the passage of the plunger *e* to the right end of the cylinder *a*, the steam can exhaust itself through the pipe or port *k* into the cylinder *b*.

The function of the pipe *q'* may be explained thus: Suppose that the engine stops at such a phase of the piston that the plunger *f* is at the extreme left of the cylinder *b*. Then there would be difficulty in starting the engine again; but in view of the pipe *q'*, which has a valve *q''*, steam may be allowed to enter and force the piston-plunger and thereby start the engine, after which the operation becomes automatic. The connecting-rod *r* is pivoted to the plunger *f* by means of a bolt *s* passing through the same. In order that there may be no rotation of the plunger, there is provided a guide *t* and a slide *u* for it to glide along. The slide consists of two angle-irons, which are attached to the plate by means of bolts *v*.

Those parts of the engine not herein particularly described are omitted from description, because the same are not a part of the invention, but common to most other steam-engines. In practice the port or pipe *q* corresponds to the port *g*. (Seen in Fig. 2.) The plungers are surrounded by packing *w*. If the steam leaks, the packing can be tightened by means of the plates *x* and bolts *y*. In an ordinary steam-engine with pistons it cannot be told if the steam leaks from one end to the other of the cylinder. If such leakage does take place, there is much detrimental back-pressure. In my construction no such hinderance can occur.

I claim as my invention—

1. A steam-engine consisting of the combination of two cylinders whose extended axes coincide and relatively the one double the cross-section of the other and closed at those ends farthest from each other by suitable plates bolted thereto, plungers fitting in the remaining ends and rigidly connected together, a steam-chest having ports leading to the farther ends of the said cylinders, a pipe connecting the port going to the larger cylinder with that end of the smaller cylinder which is nearest the larger cylinder, a pipe *q'*, connecting with that port which leads to the larger cylinder, an exhaust-pipe leading from the steam-chest, and a valve controlling the steam and for causing it to exhaust from the smaller to the larger cylinder and from the latter to the atmosphere, the said valve being connected to an eccentric-rod.

2. In a steam-engine, the combination of a larger and smaller cylinder whose axes coincide, plungers movable therein and connected together and of such length *in totum* that it extends approximately from center to center of the said cylinders, and means for exhausting the steam from the smaller cylinder to the larger, and a supplementary pipe *q*, connecting that end of the cylinder which is nearest the other cylinder to that end of the other cylinder which is farthest from the first cylinder.

3. In a steam-engine, the combination of two cylinders whose extended axes coincide, concentric cylinders fitting movably therein, hollow and closed at one end of each, the remaining ends being connected together, and corresponding pairs of said cylinders being of such diameters that the cross-sectional areas are as one to two, a guide *t*, projecting downward from the larger inner cylinder and located between guides *u*, running parallel to and below the said first-named cylinders, and packing-boxes surrounding the said inner cylinders at ends of the outer or first-named cylinders.

In testimony that I claim the foregoing as my invention I have signed my name, in presence of two witnesses, this 1st day of February, 1892.

THOMAS THATCHER.

Witnesses:
BENJ. M. OGDEN,
CHAS. W. NOYES.